United States Patent
Ketterling

(10) Patent No.: US 11,944,024 B2
(45) Date of Patent: Apr. 2, 2024

(54) ROTARY SOD CUTTING AND SPRINKLER CAP REMOVAL TOOL

(71) Applicant: Kody J. Ketterling, Twin Falls, ID (US)

(72) Inventor: Kody J. Ketterling, Twin Falls, ID (US)

( * ) Notice: Subject to any disclaimer, the term of this patent is extended or adjusted under 35 U.S.C. 154(b) by 770 days.

(21) Appl. No.: 17/080,790

(22) Filed: Oct. 26, 2020

(65) Prior Publication Data
US 2021/0120722 A1  Apr. 29, 2021

Related U.S. Application Data

(60) Provisional application No. 62/926,328, filed on Oct. 25, 2019.

(51) Int. Cl.
| | |
|---|---|
| *A01B 1/20* | (2006.01) |
| *A01B 1/24* | (2006.01) |
| *B05B 15/52* | (2018.01) |
| *B25B 13/50* | (2006.01) |

(52) U.S. Cl.
CPC ............... *A01B 1/20* (2013.01); *A01B 1/246* (2013.01); *B05B 15/52* (2018.02); *B25B 13/5008* (2013.01)

(58) Field of Classification Search
CPC ........... A01B 1/20; A01B 1/246; B05B 15/52; A01G 3/062; A01G 3/06; B25B 13/5008
See application file for complete search history.

(56) References Cited

U.S. PATENT DOCUMENTS

| | | | | |
|---|---|---|---|---|
| 4,547,966 A | * | 10/1985 | Eden | A01G 3/06 30/DIG. 7 |
| 4,788,894 A | * | 12/1988 | Mitschele | B25B 13/50 81/488 |
| 4,832,131 A | * | 5/1989 | Powell | A01D 34/84 172/41 |
| 6,134,789 A | * | 10/2000 | Strickland | A01D 34/84 30/DIG. 7 |
| 6,311,782 B1 | * | 11/2001 | Plasek | A01G 3/06 30/DIG. 7 |
| 6,412,568 B1 | * | 7/2002 | Thede | A01G 3/06 172/13 |

(Continued)

*Primary Examiner* — Thomas B Will
*Assistant Examiner* — Julia C Tran
(74) *Attorney, Agent, or Firm* — Burdick Patents, P.A.; Sean D. Burdick; Colin L. Honan

(57) ABSTRACT

A combination sod cutting and sprinkler cap removal tool includes a socket having a cavity and outer surface extending between proximal and distal ends, a cutting means disposed circumferentially about the distal end, an internal gear formed within the cavity, and a removable rotating means insertable into the cavity and configured to rotatably engage and be axially arrested by the internal gear whether the rotating means is inserted through the proximal end or the distal end. Interior gear teeth of the internal gear have both inner and outer engagement surfaces. When inserted through the proximal end, the rotating means engages the outer engagement surfaces to configure the distal end of the tool for cutting sod by rotation of the cutting means. When the rotating means engages the internal gear through the distal end, the proximal end of the tool is configured for removing a sprinkler cap by engaging the inner engagement surfaces with gripping surfaces of the cap.

20 Claims, 5 Drawing Sheets

(56) References Cited

U.S. PATENT DOCUMENTS

| | | | |
|---|---|---|---|
| 7,237,291 B2* | 7/2007 | Redford | B25F 1/00 7/138 |
| 8,915,168 B2* | 12/2014 | Jeter, Jr. | B23B 51/08 7/138 |
| 9,517,373 B2* | 12/2016 | Rendon | B25B 27/143 |
| 10,919,068 B1* | 2/2021 | Newmeyer | B05B 15/622 |
| 2004/0000052 A1* | 1/2004 | Melker | B25B 13/48 29/890.14 |
| 2009/0255696 A1* | 10/2009 | Ortiz | A01B 1/243 172/41 |
| 2013/0333217 A1* | 12/2013 | Curry | B23P 6/00 29/271 |
| 2016/0242354 A1* | 8/2016 | Helinski | A01D 34/835 |
| 2019/0141890 A1* | 5/2019 | Craig | A01G 3/067 172/15 |
| 2021/0078143 A1* | 3/2021 | Aviguetero, Jr. | B25B 13/5091 |

\* cited by examiner

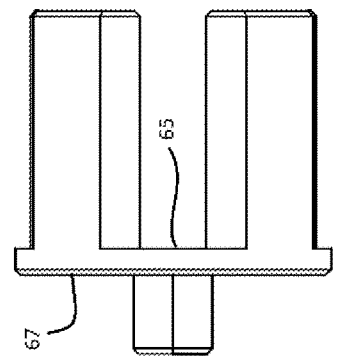
FIG.9
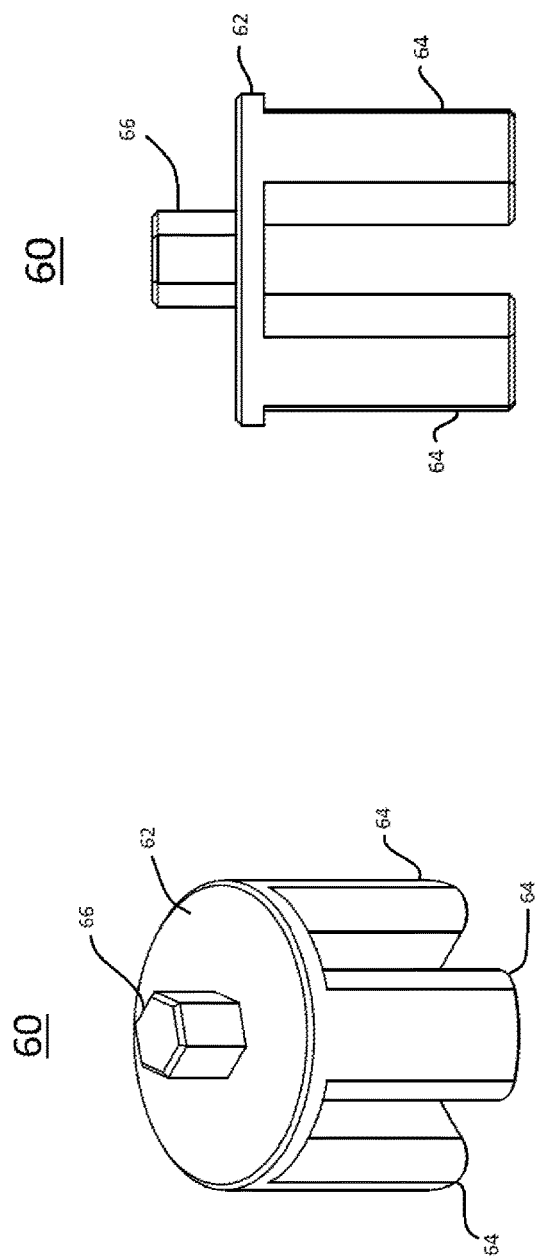
FIG.7
FIG.8
FIG. 6

US 11,944,024 B2

ROTARY SOD CUTTING AND SPRINKLER CAP REMOVAL TOOL

RELATED APPLICATIONS

This application claims priority to U.S. Provisional Application 62/926,328 that was filed on Oct. 25, 2019 and which is fully incorporated herein by reference.

BACKGROUND OF THE INVENTION

Field of the Invention

The present invention relates generally to sod cutting tools and sprinkler cap removal tools, and more specifically to a dual-purpose tool for cutting sod build-up around the cap of a pop-up sprinkler and for removing the cap.

Description of Related Art

Pop-up sprinklers in irrigation systems, particularly those installed in lawns and gardens, become buried over time due to soil build-up and grass growth in the immediate vicinity of the sprinkler cap. This causes blockage of the popup action or blockage of water flow, rendering the sprinkler unable to provide desired irrigation coverage, or difficult to remove or disassemble for replacement or maintenance purposes.

A typical solution is to dig away the grass and dirt around the sprinkler head using conventional tools such as shovels or trowels, then remove the sprinkler head from its riser (usually made of PVC) before performing maintenance on the sprinkler. The typical solution, however, is labor intensive and time consuming, and also risks introducing dirt and other debris into the sprinkler line that can clog sprinkler heads and cause further problems later on.

What is needed is a specialized tool for removing sod build-up around a pop-up sprinkler to facilitate sprinkler removal and maintenance.

SUMMARY OF THE INVENTION

The foregoing problems are overcome by a combination sod cutting and sprinkler cap removal tool according to the present invention. In a basic embodiment of the invention, a sod cutting and sprinkler cap removal tool includes a socket having a cavity and outer surface extending between proximal and distal ends, a cutting means disposed circumferentially about the distal end, an internal gear formed within the cavity, and a removable rotating means insertable into the cavity and configured to rotatably engage and be axially arrested by the internal gear whether the rotating means is inserted through the proximal end or the distal end. When the rotating means engages the internal gear through the proximal end of the socket, the tool is configured for cutting sod by causing rotation of the cutting means. When the rotating means engages the internal gear through the distal end of the socket, the tool is configured for removing a cap of a pop-up sprinkler by causing rotation of the internal gear.

In another embodiment of the invention, a sod cutting and sprinkler cap removal tool includes a socket having a cavity and an outer surface extending between a proximal end and a distal end of the socket, a cutting means disposed circumferentially about the distal end, an internal gear formed within the cavity, and a removable rotating means insertable into the cavity and configured to rotatably engage and be axially arrested by the internal gear whether the rotating means is inserted through the proximal end or the distal end. The internal gear includes a plurality of interior gear teeth, wherein each interior gear tooth has at least one outer engagement surface configured to rotatably engage the removable rotating means, and at least one of the interior gear teeth has at least one inner engagement surface configured to rotatably engage a gripping surface of a sprinkler cap.

In more elaborate embodiments of the invention, the sod cutting and sprinkler cap removal tool may includes one or more of the following features: interior gear teeth extending radially inward from an inner surface of the socket in a stepped configuration; a structure formed on the outer surface of the socket for rotating the sod cutting tool; the cutting means being removably attachable to the distal end of the socket; the internal gear formed at the proximal end of the socket; and the cutting means including a plurality of saw teeth. In another embodiment, the internal gear includes interior gear teeth, and a gear tooth bridge that cross-connects distal ends of the interior gear teeth, wherein the gear tooth bridge intersects a central longitudinal axis of the socket.

In another embodiment of the invention, the sod cutting and sprinkler cap removal tool includes a specialized removable rotating means, or drive tool designed to engage the gear tooth bridge. The drive tool includes a plurality of cantilevered gear teeth, and the gear tooth bridge is configured to axially arrest distal-to-proximal insertion of the drive tool while allowing the cantilevered gear teeth to rotationally engage the at least two interior gear teeth of the internal gear. In another embodiment, the drive tool includes a plate having a plurality of cantilevered gear teeth extending perpendicularly from a first surface of the plate and a drive stud extending perpendicularly from a second surface of the plate opposite the first surface.

In another embodiment, a rotary sod cutting assembly of the present invention includes a socket portion having a proximal end and a distal end, a rotary saw portion having a proximal end configured for attachment to the distal end of the socket portion, the rotary saw portion having a distal end configured with a sod cutting means, and the proximal end of the socket portion including a sprinkler cap removal means. A removable drive tool is configured to rotationally engage the sprinkler cap removal means. The removable drive tool may be further configured to rotatably engage and be axially arrested by the sprinkler cap removal means whether the removable drive tool is inserted into the proximal end of the socket or into the distal end of the socket. In another embodiment, the sprinkler cap removal means of the rotary sod cutting assembly includes a plurality of interior gear teeth, wherein at least one of the interior gear teeth comprises at least one inner engagement surface configured to rotatably engage a gripping surface of a sprinkler cap.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 6 is perspective view of one embodiment according to the present invention of a drive tool configured to rotationally engage a sod cutting and sprinkler cap removal tool as shown in FIG. 2.

FIG. 7 is a side view of the drive tool of FIG. 6.

FIG. 8 is a top view of the drive tool of FIG. 6.

FIG. 9 is a another side view of the drive tool of FIG. 6, after the drive tool has been rotated by 60 degrees.

DETAILED DESCRIPTION OF THE INVENTION

A combination sod cutting and sprinkler cap removal tool according to the present invention facilitates replacement or maintenance of rotary style sprinklers. In general, the tool is configured as a socket having a cavity running therethrough from proximal end to distal end. The distal end of the tool is configured with a rotary saw for cutting a circular pattern of sod around a sprinkler cap. The proximal end of the tool is configured with an internal gear configured to rotatably engage multiple different styles of commercial pop-up sprinkler caps so that a user can easily unscrew the sprinkler cap. A removable drive tool can be inserted within the tool cavity through the proximal end to engage the internal gear and cause rotation of the rotary saw when cutting sod, or through the distal end to rotate the internal gear and unscrew a sprinkler cap when the internal gear is placed into rotational engagement with the sprinkler cap.

Figure 1:
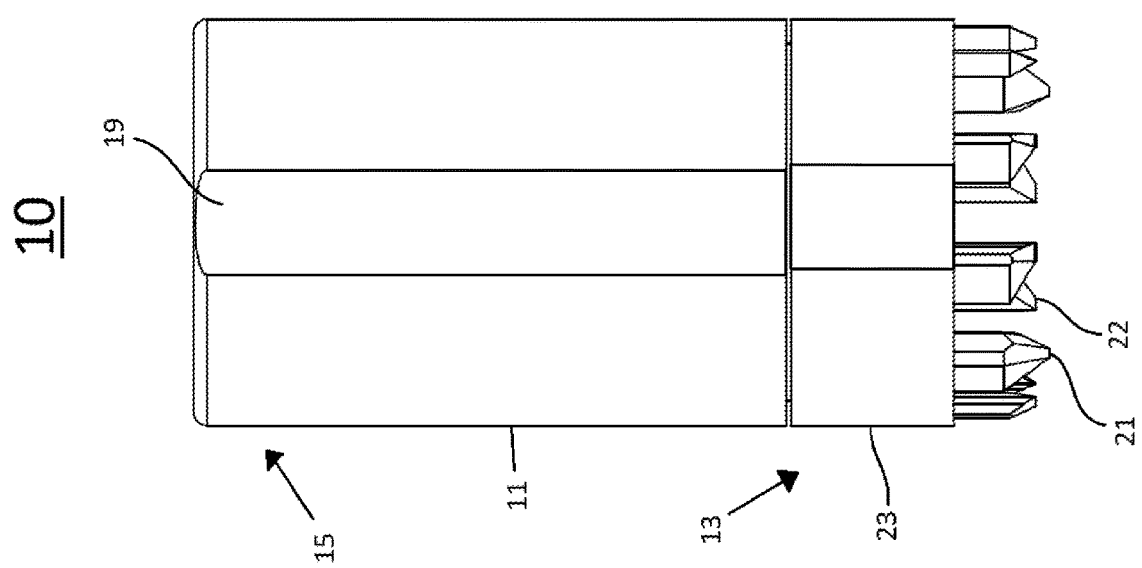
FIG. 1 is a side view of one embodiment of a sod cutting and sprinkler cap removal tool according to the present invention.

FIG. 1 shows a side view of one embodiment of a sod cutting and sprinkler cap removal tool 10 according to the present invention. The tool 10 or any part thereof may be formed at least partially from metal, such as steel, by machining, casting, and/or welding. Alternatively, the tool or any part thereof may be formed at least partially from an injection molded plastic, such as ABS, or from any other rigid material. Generally, the tool 10 is formed as a socket 11 having a distal end 13 and a proximal end 15. A cavity 17 runs through the interior of the socket 11. The outer surface or side(s) of the socket 11 may be cylindrical, rectangular, hexagonal, or any other shape. Preferably, as shown in the figures, the outer surface of the socket 11 is generally cylindrical but includes at least two opposing flat areas 19 that allow the socket 11 to be gripped by hand or by a tool such as an end wrench to facilitate rotation thereof. The distal end 13 of the tool 10 is configured with a cutting means, such as a plurality of saw teeth 21, 22. The saw teeth 21, 22 are preferably arranged circumferentially around the distal end 13, and are preferably symmetrically arranged and spaced at regular intervals, as shown. The saw teeth may all have the same configuration, or there may be more than one tooth configuration among the saw teeth.

In one embodiment, the socket 11 may comprise a singular component in which the cutting means at the distal end 13 forms an integral part of the socket. In another embodiment, as shown in FIG. 1, a separate cutting means 23 may be provided as a removably attachable component. For example, the proximal end of the cutting means 23 may be configured with pipe threading that allows the cutting means to be threaded onto, or unscrewed from, complementary pipe threading provided on the distal end 13 of the socket 11. Hereafter, a removably attachable cutting means 23 may be referred to as rotary saw portion 23.

Figure 2:
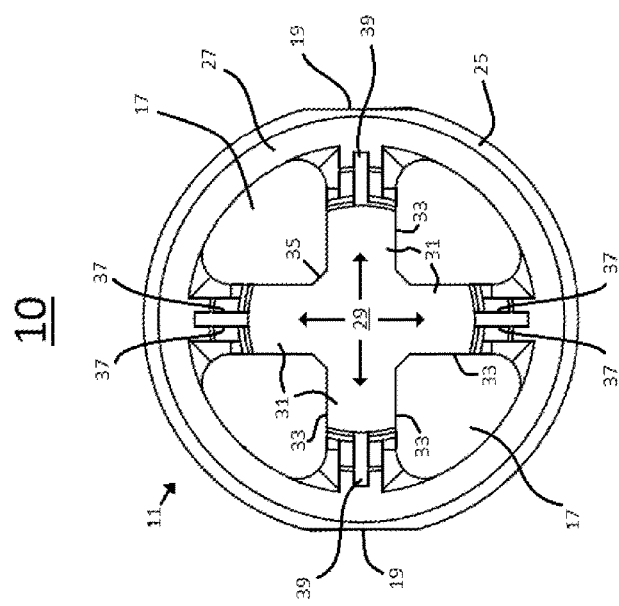
FIG. 2 is a top view of the tool of FIG. 1.

FIG. 2 shows a top view of the sod cutting and sprinkler head removal tool 10. This view shows an example of opposing flat areas 19 formed on the outer surface of the socket, which is otherwise cylindrical. A rounded or beveled edge 25 may be formed at the top of the proximal end 15 on the side wall 27 of the socket 11. In this view the cavity 17 appears as four generally triangular shaped spaces disposed 90 degrees apart (one in each interior quadrant). These spaces of cavity 17 allow for insertion of a removable rotating means 60 for either cutting sod or unscrewing a sprinkler cap, as will be described in greater detail hereafter. An internal gear 29 is disposed within the cavity 17. The internal gear 29 includes a plurality of interior gear teeth 31, each having two outer engagement surfaces 33. The outer engagement surfaces 33 are configured to rotatably engage the removable rotating means 60 to provide a means for rotating the socket 11.

The internal gear 29 is preferably formed within the cavity 17 at or near the proximal end of the socket 11. While the embodiment presented here shows the internal gear 29 having four interior gear teeth 31, embodiments are possible in which the interior gear teeth number greater or fewer than four. Here, the four interior gear teeth 31 are cross-connected by the structure of the interior gear 29 for greater operational strength. That is, internal gear 29 forms a bridge 35 crossing the center of the cavity 17 from top-to-bottom and from right-to-left, as shown in FIG. 2. The gear tooth bridge 35 preferably intersects the center longitudinal axis of the socket 11, i.e., at the center of the figure. Preferably, the bridge portion 35 of the interior gear 29 is recessed from the proximal end 15 to allow the proximal end 15 of the socket 11 to surround a sprinkler head when engaging the tool to remove a cap of the sprinkler head.

To facilitate removal of the cap of a sprinkler head, the interior gear teeth 31 are each further configured with two inner engagement surfaces 37. A space 39 between the two inner engagement surfaces 37 of any one interior gear tooth 31 is configured to allow engagement of a gripping surface of multiple different styles of commercial pop-up sprinkler caps. For example, the aforesaid configuration of interior engagement surfaces 37 will rotationally engage with gripping surfaces, or gripping fins, formed on sprinkler caps made by Rainbird®, Hunter®, K-Rain®, Orbit®, and Toro®.

Figure 3:
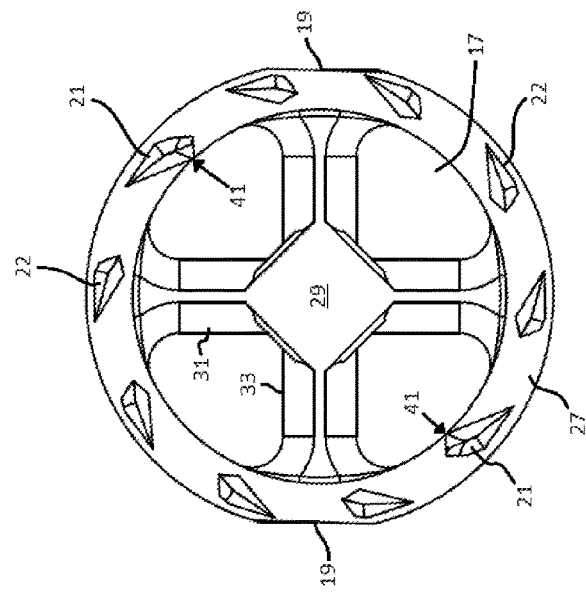
FIG. 3 is a bottom view of the tool of FIG. 1.

FIG. 3 shows a bottom view of the sod cutting and sprinkler head removal tool 10. This view shows an example of saw teeth 21, 22 disposed circumferentially about the distal end 13 of the tool 21, or equivalently, about the distal end of a removably attachable cutting means that is configured for attachment to the distal end 13 of the socket 11. The embodiment shown in FIG. 3 includes two different shapes of saw teeth, major teeth 21 and minor teeth 22. Each major tooth 21 is characterized as having a slightly greater axial length than that of a minor tooth 22, and further characterized as having an innermost edge at 41 extending nearer to the inner surface of the side wall 27. Each major tooth 21 and minor tooth 22 may slant radially inward, as shown. Each major tooth 21 and minor tooth 22 may have one or more beveled edges, on either an interior edge or an exterior edge or on both interior and exterior edges, as shown. Preferably, the radially inward slant of every saw tooth 21, 22 is configured so that when the distal end of the tool 10 is thrust into sod and the tool rotated clockwise, the leading edge of each tooth is the edge closest to the outer surface of the side wall 27. The greater length of the major saw teeth 21 advantageously allows an operator to slice the saw teeth into the sod more gradually, rather than thrusting all saw teeth 21, 22 into the sod simultaneously and risk getting the tool stuck. Also, the inwardly slanting saw teeth, especially the more deeply slanted edge of the saw teeth 21, direct sliced sod material inward to minimize lawn damage and mess. Other embodiments of the invention are possible where the cutting means 23 includes only a single type of saw tooth, or other configurations of saw teeth of varying shapes and sizes.

Figure 4:
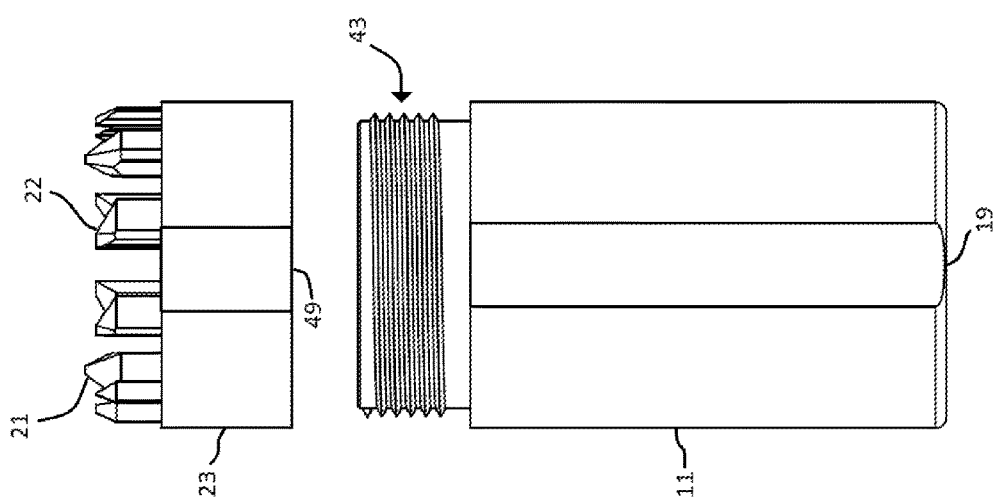
FIG. 4 is an exploded inverted side view of one embodiment of a sod cutting and sprinkler removal tool similar to that depicted in FIG. 1, showing a rotary saw portion removed from a socket portion.

FIG. 4 shows an exploded inverted side view of the sod cutting and sprinkler head removal tool 10. In this view, the rotary saw portion 23 is shown removed from the socket portion 11 of the tool. The rotary saw portion 23 is configured to engage the socket portion 11, for example, by means of a threaded connection, the male component of which is depicted at 43. Male threads 43 mate with complementary female threads 44 formed on an inner surface of the rotary saw portion 23. The rotary saw portion 23 may also feature one or more flat portions 49 formed on its outer surface, as shown, to provide an engagement surface when rotating the rotary saw portion 23 manually or with a tool such as an end wrench. In one embodiment, the threads 43 are configured to align flat area 19 with flat area 49 when the threads 43 are fully engaged within the rotary saw portion 23. In another embodiment, the threads 43 are configured to misalign flat area 19 with respect to flat area 49 by about 90 degrees when the threads 43 are fully engaged within the rotary saw portion 23. The 90-degree misalignment can advantageously assist in disengagement of the rotary saw portion 23 from the socket 11, especially for manual disengagement for users whose natural tendency is to engage their gripping hands about 90 degrees apart when unscrewing one object from another. According to the invention, a removably attachable design for the rotary saw portion 23 allows for removal and replacement of the rotary saw portion 23 should any of the saw teeth become dull, broken, or worn out.

Figure 5:
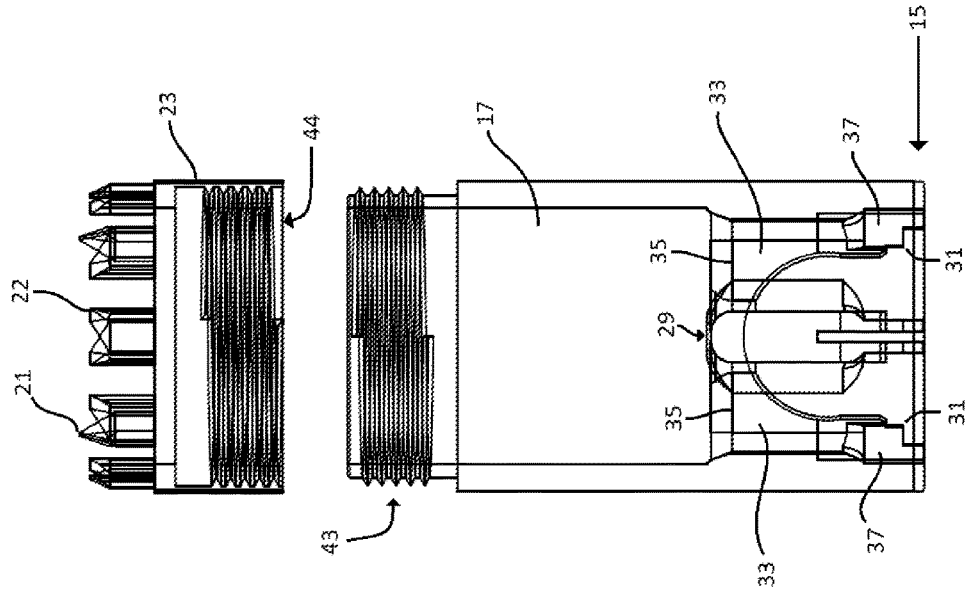
FIG. 5 is a cutaway view of the exploded inverted side view of the tool of FIG. 4, after the tool has been rotated by 90 degrees.

FIG. 5 shows a cutaway view of the exploded inverted side view of FIG. 4, after the rotary sod cutting tool has been rotated by 90 degrees. This view shows structure for the internal gear 29, interior gear teeth 31, and gear tooth bridge 35. At the proximal end 15, the interior gear teeth 31 extend radially inward from an inner surface of the socket in a stepped configuration. The stepped configuration of the internal gear teeth 31 reduces the radial width of the cavity 17 between opposing steps in the distal direction. The stepped configuration thus allows the internal gear 29 to engage sprinkler caps of different radial sizes. FIG. 5. also illustrates the distal recess of the gear tooth bridge 35 of the interior gear 29 with respect to the proximal end 15, which recess allows the proximal end 15 of the socket 11 to surround a sprinkler head when engaging the tool to remove a cap of the sprinkler head. In other words, the amount of recess must allow sufficient cavity space in the immediate vicinity of the proximal end 15 to allow the cap of a sprinkler head to be inserted between the arcs of the gear tooth bridge 35 far enough so that gripping surfaces on the cap of the sprinkler head engage the inner engagement surfaces 37 of the interior gear teeth 31.

FIG. 6 shows a perspective view of one embodiment of a removable means for rotating a sod cutting and sprinkler cap removal tool according to the invention. Hereafter, such removable means will be referred to as drive tool 60. Drive tool 60 is configured to rotationally engage a tool 10 as shown in the previous figures. It is a removable tool because it is configured for insertion into and withdrawal from the cavity 17, through either the distal end 13 or the proximal end 15. In one embodiment, the drive tool 60 includes a plate 62, a plurality cantilevered gear teeth 64 extending perpendicularly from a first surface 65 of the plate 62, and a drive stud 66 extending perpendicularly from a second surface 67 of the plate 60 that is opposite the first surface 65. Each of the cantilevered gear teeth 64 is configured to rotationally engage an engagement surface 33 of an interior gear tooth 31, to facilitate rotation of the cutting tool 10. In other words, the cross section of each cantilevered gear tooth 64 matches the shape of the cavity areas 17 shown in FIGS. 2 and 3, so that when the drive tool 60 is inserted into the socket 11, and oriented so that the cantilevered gear teeth 64 align with the outer engagement surfaces 33 of interior gear teeth 31, the cantilevered gear teeth can be extended through the cavity areas 17 to rotationally engage the drive tool 60 to the internal gear 29. The drive tool 60 may be rotated by applying torque to the drive stud 66, either manually or from a rotary power tool, for example, using a ratchet or a power drill. In one embodiment, the drive stud 66 has a hexagonal configuration and is centered on the plate 62.

The gear tooth bridge 35 is preferably placed at a location between the distal end 13 and the proximal end 15 of the socket 11, but closer to the proximal end 15. The gear tooth bridge is configured to arrest distal progress of the drive tool 60 when the drive tool 60 is inserted into the cavity 17 from the proximal end 15, while still allowing the drive tool 60 to rotationally engage the internal gear 29. Preferably, when the drive tool 60 is thus fully inserted into the proximal end 15, the drive stud 66 remains outside of the cavity 17 for easy access by an operator. The gear tooth bridge 35 is also configured to arrest proximal progress of the drive tool 60 when the drive tool 60 is inserted into the cavity 17 from the distal end 13, while still allowing the drive tool 60 to rotationally engage the internal gear 29. Preferably, when the drive tool 60 is thus fully inserted into the distal end 13, the drive stud 66 rest deep within the cavity 17, and can be driven using a socket extension or drive bar extension, as are well known in the mechanical arts.

FIGS. 7, 8, and 9 show side, top, and 60-degree rotated side views, respectively, for the drive tool of 60. The drive tool 60 may be formed as a singular piece of rigid material, e.g. from metal or plastic by machining, casting, or molding.

Figure 10:
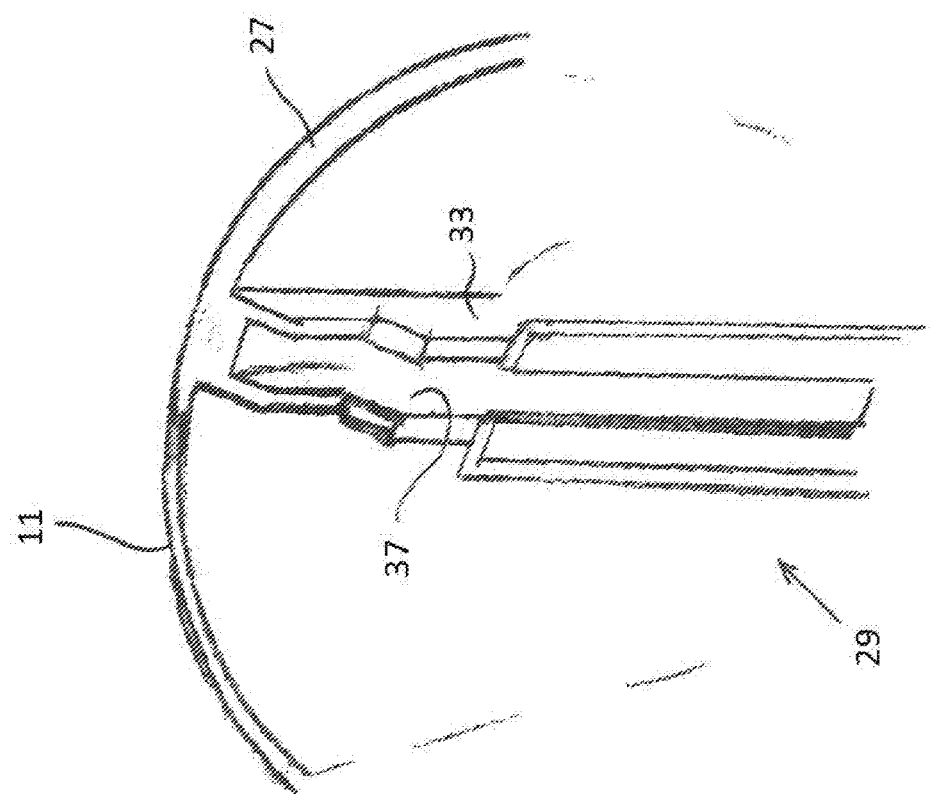
FIG. 10 is a magnified perspective view of one embodiment of an internal gear formed within a tool according to the invention, the internal gear having both outer engagement surfaces and inner engagement surfaces.

FIG. 10 shows a magnified perspective view of one embodiment of an internal gear 29 formed within a tool according to the invention, to better illustrate the upper structure of an internal gear and the form and location of its outer engagement surfaces 33 and inner engagement surfaces 37. An outer engagement surface 33 is indicated on the outer side of the right-most stair-step structure. The outer engagement surface 33 extends vertically along the steps throughout the change in radial length of the steps. An inner engagement surface 37 is indicated on the inner side of the left-most stair-step structure. The inner engagement surface 37 also extends vertically along the steps throughout the change in radial length of the steps.

In terms of size, one exemplary embodiment of the invention provides a tool 10 having an overall height of about 7.5 in., an outer diameter of about 3.5 in., an inner diameter of about 3.125 in., a saw tooth length of about 0.75 in., and a saw tooth width of about 0.74 in. The width of flat areas 19 and 49 is about 1.0 in. The maximum recess length from the proximal end 15 to the center of the gear tooth bridge 35 is about 2.0 in. Each stair-step height and radial length is about 0.25 in., and the gap between inner engagement surfaces of a single internal gear is about 0.1875 in. The width of each interior gear tooth 31 is about 0.5 in.

In operation on a popup sprinkler in which sod has built up around the cap of the sprinkler, an operator first uses tool 10 as a sod cutting tool by placing the distal end 13 of the socket 11 around the sprinkler cap so that the saw teeth 21, 22 surround the sprinkler cap. Preferably, the operator initially thrusts only the major teeth 22 into the sod, and begins rotating the tool 11 clockwise and counterclockwise to define a circular slice through the sod to get the cut started. The operator may then thrust all of the saw teeth deeper into the sod while rotating the tool 10 only in cutting direction (preferably clockwise) that, according to saw tooth configuration, urges sod debris to the interior of the tool. Continued clockwise rotation causes the saw teeth to slice through grass, dirt, and other debris that has built up around the sprinkler. The debris may then be easily removed from the sprinkler site. The operator may then flip the tool 10 end-to-end, and proceed to use the tool 10 as a sprinkler cap removal tool. The operator places the proximal end of the tool 10 over the top of a sprinkler cap, to surround the sprinkler cap within the cavity 11 and adjust the position of the tool 10 until the inner engagement surfaces 37 of the internal gear 29 rotationally engage with gripping surfaces of the sprinkler cap. The operator can now remove the sprinkler cap by rotating the tool counterclockwise. During either usage of tool 10, whether as a sod cutting tool or as a sprinkler cap removal tool, if the operator needs to impart greater torque to cut sod or to dislodge a stuck sprinkler cap, the operator can use the drive tool 60 for this purpose. When cutting tough sod, the operator may insert the drive tool 60 into the proximal end 15 of the tool 10 so that the cantilevered gear teeth 64 engage the outer surfaces 33 of the interior gear teeth 31 and axial progression of the drive tool 60 is arrested by the internal gear 29. The operator may now connect a tool such as a socket wrench to the drive stud 66 to provide greater torque to the tool 10. Similarly, when attempting to unscrew or disconnect a stuck sprinkler cap, the operator may insert the drive tool 60 into the distal end 13 of the tool 10 so that the cantilevered gear teeth 64 engage the outer surfaces 33 of the interior gear teeth 31 and axial progression of the drive tool 60 is arrested by the internal gear 29. This may require deep insertion of the drive tool 60 within the cavity 11, so that a socket extension may need to be connected to the drive stud 66 prior to insertion. Using a socket wrench or functional equivalent, the operator may now provide greater torque to the tool 10 to unscrew the stuck cap.

Figure 11:
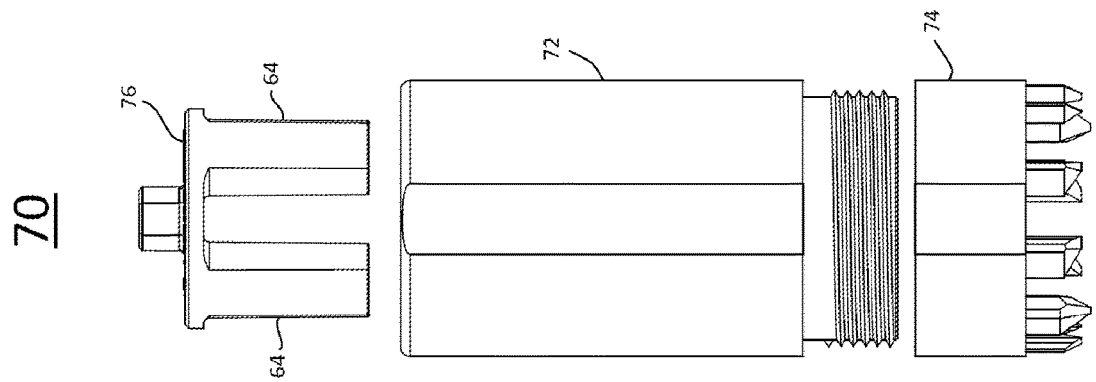
FIG. 11 is an exploded side view of an embodiment of a rotary sod cutting tool assembly according to the invention.

FIG. 11 shows an exploded side view of rotary sod cutting assembly 70, which is another embodiment of a tool according to the invention. Assembly 70 illustrates three main components of the tool in spatial relation: socket 72, rotary saw 74, and removable drive tool 76. Form and function of these components are similar to those of the socket 11, cutting means 23, and removable rotating means 60 described above.

Figure 12:
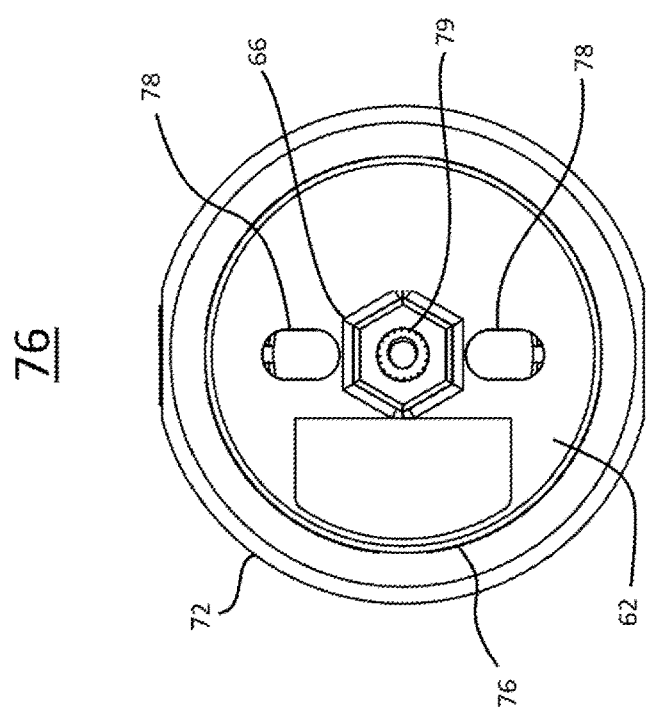
FIG. 12 is a top view of the embodiment of FIG. 11.

FIG. 12 shows a top view of rotary sod cutting assembly 70. A plate 62 atop the drive tool 76 provides additional structural features. A drive stud 66, which is preferably hexagonal, is mounted in the center of the plate 62 to provide an attachment point for a torqueing tool. Holes 78 are sunk into the surface of the plate 62 on either side of the drive stud 66, to allow for engagement with tines of a valve turning tool, fork, or turn-on key, to provide an alternate means for rotating the drive tool 76 when it is inserted deep into the socket 72. An attachment means 79 is provided on the upper surface of the drive stud 66. In one embodiment, the attachment means 79 is a threaded hole. The threaded hole may provide a convenient attachment point for an adapter configured to clamp a turn-on key to the drive tool, e.g. by pawl or snap-fit action.

Figure 13:
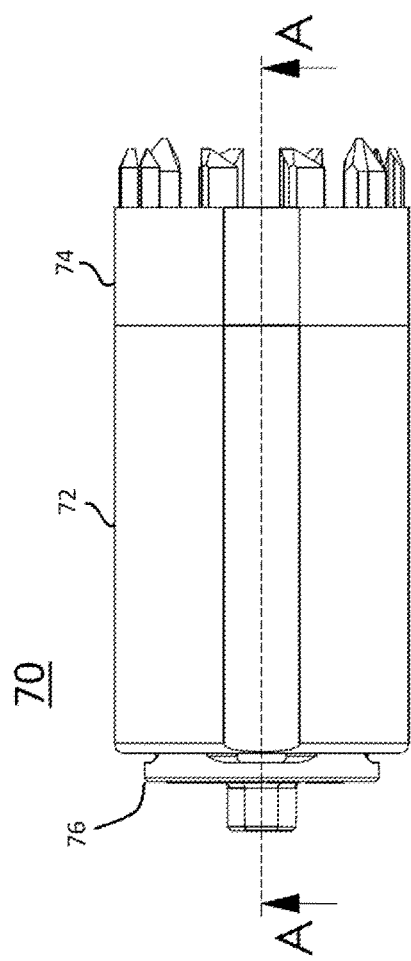
FIG. 13 is a side view of the embodiment of FIG. 11, showing the rotary sod cutting tool fully assembled.
Figure 14:
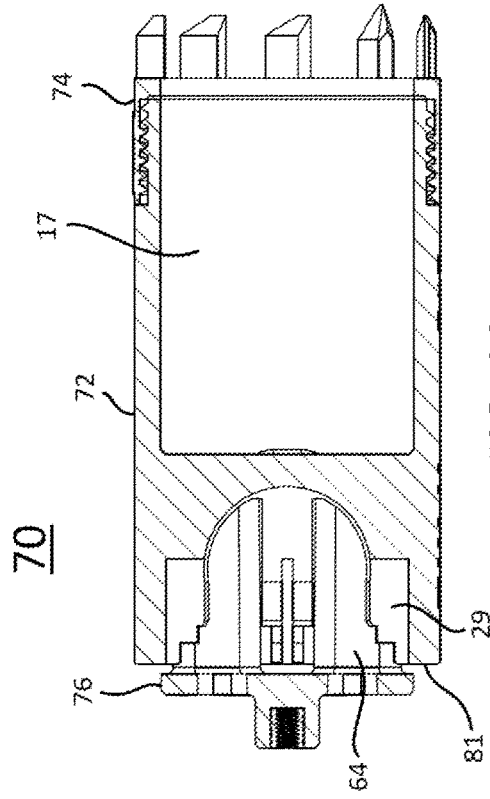
FIG. 14 is a cross sectional side view of the embodiment of FIG. 11, taken across section line A-A in FIG. 13.

FIG. 13 is a side view of the embodiment of FIG. 11, showing the rotary sod cutting tool fully assembled. In this embodiment, axial progress of the drive tool 76 into the proximal end of the socket 72 is arrested by the upper rim 81 of the socket 72. When so arrested, the cantilevered gear teeth 64 fully engage the outer engagement surfaces of the internal gears 29, as shown in the cross sectional side view of FIG. 14.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A sod cutting and sprinkler cap removal tool, comprising:
   a socket having a cavity and an outer surface extending between a proximal end and a distal end of the socket;
   a cutting means disposed circumferentially about the distal end;
   an internal gear formed within the cavity; and
   a removable rotating means insertable into the cavity and configured to rotatably engage and be axially arrested by the internal gear whether the rotating means is inserted through the proximal end or the distal end.

2. The tool of claim 1 wherein the internal gear is further configured to provide a sprinkler cap removal means.

3. The tool of claim 1 wherein the internal gear comprises a plurality of interior gear teeth, each interior gear tooth having at least one outer engagement surface configured to rotatably engage the removable rotating means, and at least one of the interior gear teeth having at least one inner engagement surface configured to rotatably engage a gripping surface of a sprinkler cap.

4. The tool of claim 3 wherein the at least one of the interior gear teeth extends radially inward from an inner surface of the socket in a stepped configuration.

5. The tool of claim 1 further comprising a means formed on the outer surface of the socket for rotating the sod cutting tool.

6. The tool of claim 1 wherein the cutting means is removably attachable to the distal end of the socket.

7. The tool of claim 1 wherein the internal gear is formed at the proximal end of the socket.

8. The tool of claim 7 wherein the internal gear comprises at least two interior gear teeth and a gear tooth bridge cross-connecting distal ends of the at least two gear teeth.

9. The tool of claim 8 wherein the gear tooth bridge intersects a central longitudinal axis of the socket.

10. The tool of claim 8 wherein the removable rotating means comprises a plurality of cantilevered gear teeth; and
    wherein the gear tooth bridge is configured to axially arrest distal-to-proximal insertion of the removable rotating means while allowing the cantilevered gear teeth to rotationally engage the at least two interior gear teeth of the internal gear.

11. The tool of claim 1 wherein the removable rotating means comprises a drive stud.

12. The tool of claim 1 wherein the removable rotating means comprises a plurality of cantilevered gear teeth.

13. The tool of claim 1 wherein the removable rotating means comprises a plate having a plurality of cantilevered gear teeth extending perpendicularly from a first surface of the plate and a drive stud extending perpendicularly from a second surface of the plate opposite the first surface.

14. The tool of claim 1 wherein the cutting means further comprises a plurality of saw teeth.

15. The tool of claim 14 wherein at least one of the saw teeth slant radially inward.

16. The tool of claim 15 wherein the at least one saw tooth comprises multiple beveled edges.

17. A rotary sod cutting assembly, comprising:
    a socket portion having a proximal end and a distal end; and
    a rotary saw portion having a proximal end configured for attachment to the distal end of the socket portion, and having a distal end configured with a sod cutting means;
    the proximal end of the socket portion comprising a sprinkler cap removal means; and
    a removable drive tool engagement means, partially enclosed within the socket portion, and configured to rotationally engage and be axially arrested by the sprinkler cap removal means whether the removable drive tool engagement means is inserted into the proximal end of the socket or into the distal end of the socket.

18. The assembly of claim 17 wherein the sprinkler cap removal means comprises a plurality of interior gear teeth, and wherein at least one of the interior gear teeth comprises at least one inner engagement surface configured to rotatably engage a gripping surface of a sprinkler cap.

19. The assembly of claim 17 wherein the removable drive tool engagement means comprises a plate with a drive stud extending in a first direction and at least one cantilevered gear tooth extending in a second direction opposite from the first direction.

20. The assembly of claim 19 comprising a plurality of cantilevered gear teeth.

\* \* \* \* \*